(12) United States Patent
Lawson et al.

(10) Patent No.: US 6,893,588 B2
(45) Date of Patent: May 17, 2005

(54) NITROGEN BLOW MOLDING TO ENHANCE OXYGEN SCAVENGER SHELF-LIFE

(75) Inventors: Anne M. Lawson, Etters, PA (US); John Buttermore, York, PA (US)

(73) Assignee: Graham Packaging Company, L.P., York, PA (US)

(*) Notice: Subject to any disclaimer, the term of this patent is extended or adjusted under 35 U.S.C. 154(b) by 0 days.

(21) Appl. No.: 10/600,537

(22) Filed: Jun. 23, 2003

(65) Prior Publication Data

US 2004/0256758 A1 Dec. 23, 2004

(51) Int. Cl.[7] .............................................. B29C 49/46
(52) U.S. Cl. .................... 264/85; 264/512; 264/513; 264/523
(58) Field of Search .................... 264/85, 512, 513, 264/523

(56) References Cited

U.S. PATENT DOCUMENTS 5,676,267 A * 10/1997 Slat et al. .................. 215/12.1
5,788,926 A * 8/1998 Oda et al. .................. 264/512
6,083,585 A * 7/2000 Cahill et al. ............... 428/35.7
2004/0091649 A1 * 5/2004 Ruppman et al. .......... 428/35.7

FOREIGN PATENT DOCUMENTS

JP          57-185119 A  * 11/1982

* cited by examiner

*Primary Examiner*—Suzanne E. McDowell
(74) *Attorney, Agent, or Firm*—Venable LLP; Keith G. Haddaway; James R. Burdett

(57) ABSTRACT

A method of manufacturing a container for containing an oxygen sensitive products from a heated plastic by blow molding the plastic with a compressed gas that is inert to the oxygen sensitive product. The heated plastic may contain an oxygen barrier layer or an oxygen scavenging component. The gas is also inert to the oxygen scavenging component, if it is present. An exemplary compressed gas is nitrogen gas. The blow molding may be extrusion blow molding, injection blow molding or stretch blow molding. The plastic may be, for example, a polyolefin, a nylon, or a polyester.

5 Claims, 2 Drawing Sheets

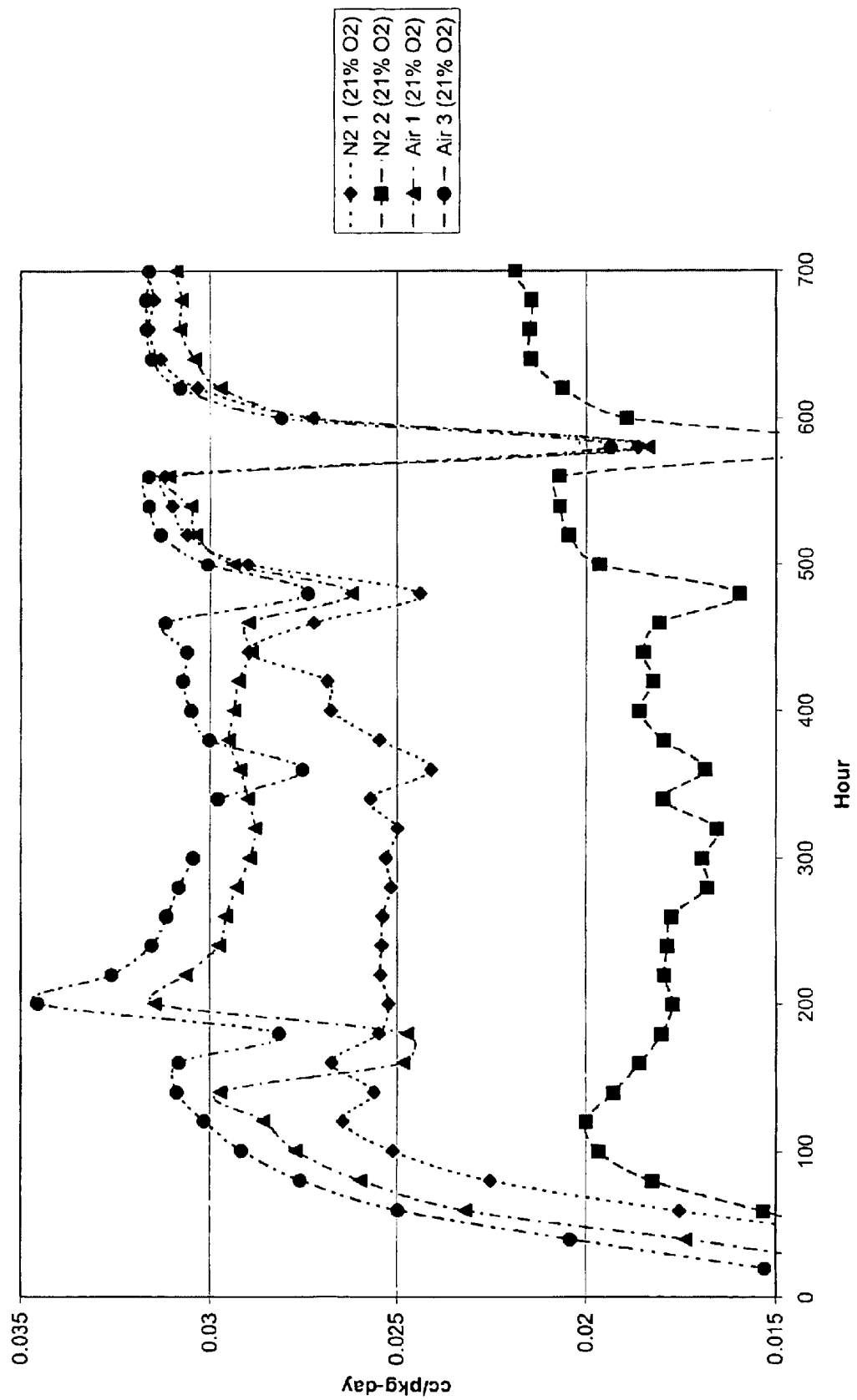

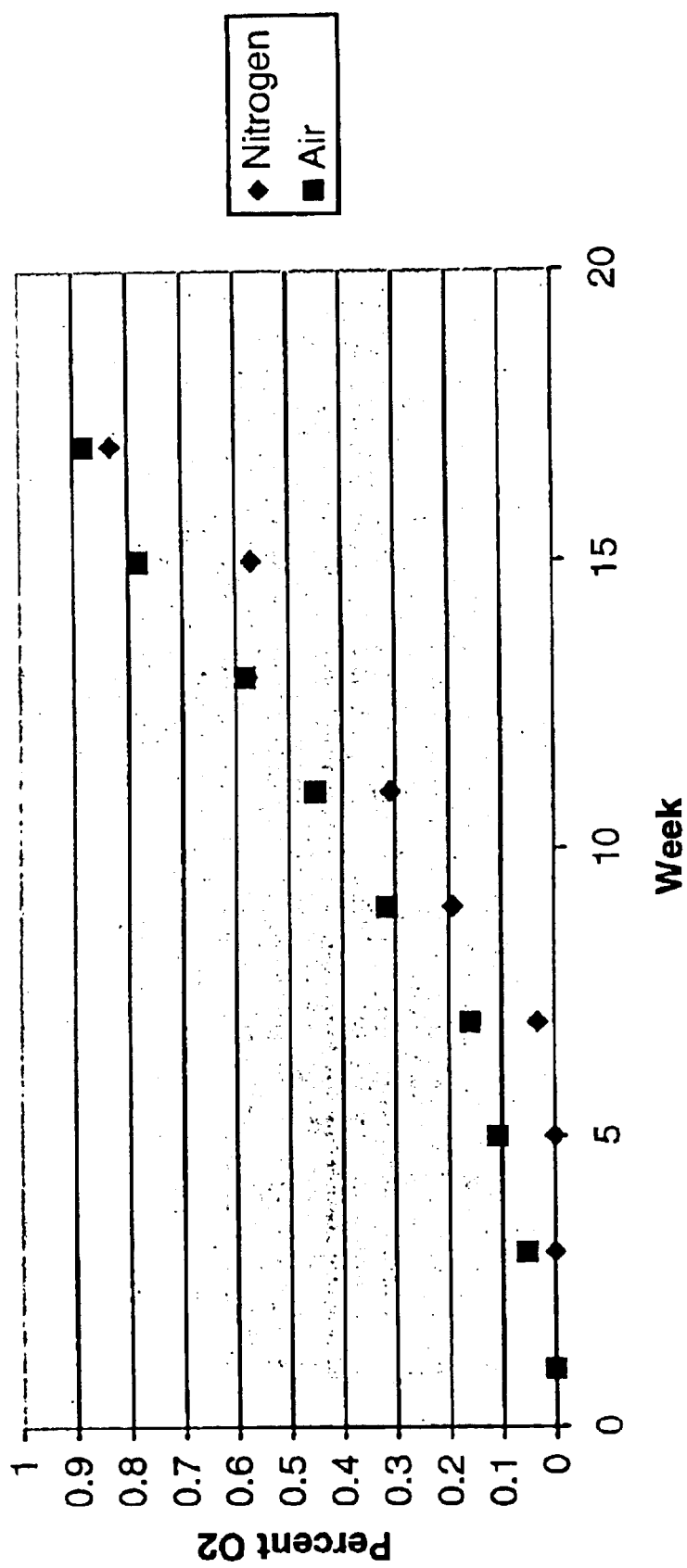

NITROGEN BLOW MOLDING TO ENHANCE OXYGEN SCAVENGER SHELF-LIFE

BACKGROUND OF THE INVENTION

1. Field of the Invention

The present invention relates generally to the manufacture of plastic containers, and more particularly to blow molded plastic containers having an imbedded oxygen-scavenger.

2. Related Art

In recent years, plastic containers have come into frequent use as replacements for traditional glass containers. Typically these plastic containers are made by a blow molding process such as extrusion blow molding, injection blow molding and stretch blow molding. The process generally involves inflating, with pressurized air, a softened tube of polymer into a mold and then cooling the resulting container. In extrusion blow molding, a hollow polymer tube is extruded. One end of the tube is clamped in a mold, forming the bottom of the container. The tube is then inflated with compressed air through the open end, or through a needle inserted into the tube. In injection blow molding, a core pin is inserted into a mold. Plastic is extruded from the core pin forming a test-tube like shape. The core pin with plastic tube is then placed in a second mold where air is blown through the core pin causing the tube to expand into the mold. Stretch blow molding is similar to injection blow molding, except that the tube is preformed and must be heated before being blown. Blow molding is well known to those skilled in the art.

Blow molding can be used to form containers from a variety of plastics, such as, for example, polyolefins, nylon, and polyesters. Polyolefins include polypropylene, high density polyethylene and low density polyethylene. Polyesters include polyethylene terephthalate (PET).

The use of plastic containers, particularly blow molded plastic containers, offers several advantages over glass containers. For example, plastic containers are generally cheaper to produce; require less energy for production; are generally lighter in weight, thus reducing shipping costs; and are more recyclable. However, the use of plastic containers has several drawbacks. One of the primary uses for plastic containers is in packaging food and beverages, for example juices, applesauce and the like. Many beverages are often placed in containers using a hot fill process. In the hot fill process, the product is added to the container at an elevated temperature, the container is capped and the packaged product allowed to cool. The cooling process results in the formation of a vacuum in the now closed container. While the rigidity of glass containers allows them to easily withstand these vacuum forces, more pliable plastic containers can be subject to distortion under such conditions. One of the initial drawbacks when using plastic as a replacement for glass was in producing a container with sufficient structural integrity to withstand the elevated temperatures and vacuum formed during the hot fill process. This has been accomplished in now well established ways by the use of structural features, for example ribs, that maintain the shape of the container and vacuum panels that flex to assist in relieving the stresses caused by the vacuum.

As uses for plastic containers as a replacement for glass increases, additional challenges are presented. For example, many fruit juices and food products, such as, for example, cranberry juice, grapefruit juice, orange juice, sports drinks, spaghetti sauce, applesauce and the like, are susceptible to oxidation from atmospheric oxygen. In contrast to glass, plastics, and particularly PET, one of the most common plastics used for containers, are generally at least partially oxygen permeable. Thus, upon storage, oxygen from the atmosphere tends to migrate into the container where it can react with the contents. As a result, the shelf-life of these oxidizable contents in plastic containers is reduced relative to the shelf-life when packaged in less permeable glass containers. Several methods have been developed to reduce the oxygen permeability of plastic containers. The most commonly used methods are the use of an oxygen barrier layer or an oxygen scavenger that reacts with oxygen as it diffuses through the container.

Oxygen barrier layers are generally used in two ways. In a first approach, a curable polymer, for example an epoxy-amine composition, is applied as an oxygen barrier over the bottle after it is blow molded. Such layers are disclosed in, for example, U.S. Pat. No. 5,489,455 to Nugent et al. This approach has several disadvantages. For example, the application and curing of the coating adds steps, and therefore time and expense, to the manufacturing process. In a second approach, a container is formed using an oxygen barrier layer as one of several layers in a container. The oxygen barrier layer can be a polymer that is less permeable to oxygen than the base polymer. Examples of plastics that can be used as oxygen barriers include nylon and poly(ethylene co-vinyl alcohol) (EVOH). This layer may be attached to or sandwiched between a structural layer. This approach also adds complexity and cost to the manufacturing process. For example, expensive multiple extruders must be used in the molding process; compatibility, particularly the ability of the oxygen barrier material to bond with the structural resin may present difficulties or require the use of yet another adhesive layer, and the cost of the barrier resin may be high.

In the oxygen scavenging approach, blow molded plastic bottles, for example, PET bottles, have oxygen scavenging components added to the base plastic. Suitable oxygen scavenging components are well-known in the industry. Oxygen scavengers within the PET walls, such as, for example Amosorb® available from BP Amoco Chemicals, react with oxygen diffusing through the package sidewall as well as with oxygen inside the package, both in the packaged product and in the headspace remaining after packaging. See, for example, U.S. Pat. No. 6,083,585.

Many of the conventionally used oxygen scavengers are activated by low levels of moisture. This causes the scavengers to react with oxygen immediately upon the production of an article, such as a preform or a bottle. As this oxygen reacts with the oxygen scavenger, the oxygen scavenging ability of the article declines, even before product is put in the container. Moreover, once the container having the oxygen scavenger is formed, the thin sidewalls allow oxygen to diffuse into the walls at a faster rate where it can react with the oxygen scavenging components. As the oxygen scavenger is consumed, the scavenging ability of the container is reduced. This further decreases the potential shelf-life of the packaged product before packaging and therefore makes storage of the empty bottles problematic.

One solution to this problem requires the use of stretch blow molding techniques. Because preforms are much thicker than bottles, the diffusion of oxygen through the sidewalls of a preform is very slow, relatively small amounts of the oxygen scavenging compound are consumed, and little scavenging ability is lost. Thus, one method of preventing pre-packaging oxygen diffusion is to store the preforms rather than the bottles. The bottles are then blow molded just before they are needed. However, this creates warehousing and scheduling difficulties in the production environment. Furthermore, this is not a viable solution when containers are molded at one facility and shipped to another facility for filling.

Another method of minimizing pre-packaging oxygen diffusion is to make multilayer containers. Multilayer containers can have a central layer that contains the oxygen scavenging compound, and outer layers that "sandwich" the inner layer. The outer layers do not typically contain the oxygen scavenging compound, and serve as barriers to slow the diffusion of oxygen into the inner layer. However, the process of using compressed air to blow multilayer containers forces the oxygen in the compressed air into the non-reactive outer layers, where it can then more readily diffuse into the inner layer. Again, as the container walls become thin after blow molding, the rate of oxygen diffusion into the walls increases and the shelf-life is compromised. In addition, as with the use of multilayered bottles incorporating oxygen barrier resins, the use of multiple layers presents similar problems in terms of machine complexity.

There is thus a continuing need for improved methods of preparing and storing blow molded plastic containers for packaging oxygen sensitive products where the containers include containing oxygen scavenging components or oxygen barrier materials that overcome the shortcomings of conventional solutions. There is a particular need for achieving these goals in a manner that allows the use of monolayer resins in bottle manufacturing.

SUMMARY OF THE INVENTION

In an exemplary embodiment of the present invention a method for stretch blow molding of bottles for packaging oxygen sensitive products is disclosed. The method involves manufacturing a container from a heated plastic by blow molding the plastic with a compressed gas to which the oxygen sensitive product is inert for example, compressed nitrogen gas. The heated plastic may be multilayered, having an oxygen barrier layer and a gas permeable layer, or monolayered wherein the monolayer comprises an oxygen scavenging component. When an oxygen scavenging component is present, the compressed gas is selected to be inert to the oxygen scavenging component. The blow molding may be extrusion blow molding, injection blow molding or stretch blow molding. The plastic may be, for example, a polyolefin, such as polypropylene, high density polyethylene, and low density polyethylene; a nylon; and a polyester, for example PET. The method is useful in blowing monolayer and multilayer articles. In the case of stretch blow molding, the heated plastic may be a preform. The heated plastic may be a monolayered material or a multilayered material that has an inner layer comprising an oxygen scavenging component, and two outer layers that do not contain an oxygen scavenger, although other multilayered arrangements are also suitable. During the process, the compressed gas can saturate the walls of the container.

The invention is also a method of extending the shelf-life of an oxygen sensitive product in a plastic container by placing a plastic into a mold, inflating the heated plastic with a compressed gas that is inert to the oxygen sensitive product, cooling the molded container, and removing the container from the mold. The heated plastic can be in the form of an extruded or injection molded tube or a preform, for example an injection molded preform. The heated plastic may be a monolayered or a multilayered material. Shelf-life of a packaged product may be extended by 20–300%, for example by five to fourteen days.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings.

FIG. 1 depicts a graph comparing oxygen transmission rates (OTR) over time of air-blown and nitrogen-blown bottles; and FIG. 2 depicts a graph comparing the change in headspace oxygen over time in air-blown and nitrogen-blown bottles.

DETAILED DESCRIPTION OF THE PRESENT INVENTION

An exemplary embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

As described above, one of the drawbacks of prior art uses of moisture activated oxygen scavenging resins to reduce oxygen permeability of plastic containers is the deterioration or reaction of the oxygen scavenging component before product is even added to the container. When monolayer resins are employed, the amount of oxygen scavenger is very low, for example on the order of 0.54% by weight. The process of blow molding itself affects the oxygen scavenging ability of the material. This is due to, among other things, the use of air, which contains about 20.9% oxygen, as the blowing agent to inflate the containers during the blow molding process. The oxygen from the air that is forced into or comes in contact with the container walls begins to react with the oxygen scavenging material immediately upon molding, reducing the potential shelf-life of the packaged product.

According to the present invention, one way of preventing this reaction of the oxygen scavenging component before packaging a product is to reduce the amount of oxygen that comes in contact with the wall or is infused into the wall. The typical blow molding process is conducted at an elevated temperature by blowing high pressure air into the interior of the container. The use of high temperatures and pressures results in a higher rate of transfer of oxygen into the container wall, a more rapid and readily achieved saturation of the container wall with air, and a more rapid initiation of the reaction of oxygen with the oxygen scavenging component.

According to the present invention, a compressed inert blowing agent, instead of air, is used to blow mold plastic packages containing oxygen scavenging component. As used herein, an inert blowing agent is a gas that does not react with the oxygen sensitive product to be placed in the container. The inert blowing agent is also non-reactive with oxygen scavenging component in the wall of the container, if the plastic includes an oxygen scavenging component. An exemplary blowing agent is nitrogen. In addition, inert gases such as argon, neon or helium, can be used, as well as other gases that do not react with the oxygen scavenger, for example carbon dioxide. Using an inert blowing agent, rather than air, substantially eliminates reactive oxygen from the blowing agent and instead saturates the package sidewall with molecules that are inert to the oxygen scavenger. Thus, before oxygen can migrate into the container walls, the inert blowing agent must diffuse out or through the walls. As a result, even though the preforms or bottles are stored in a manner where they are exposed to the environment, the rate of the subsequent migration of oxygen into the container walls is reduced and less of the oxygen scavenging component reacts prior to introduction of the product into the container.

Use of the present invention can reduce the oxygen transfer rate through container walls and thus extend the time for which container walls prevents oxygen transmission to the product sealed within the container. This translates into a measurable shelf-life extension as compared to the use of air as a blowing agent. This can be demonstrated by measuring the oxygen transmission rate (OTR) through a container wall. In the absence of an oxygen scavenging component, the rate of oxygen transmission through a typical PET container wall in air can be about 0.025–0.032 cc/pkg-day. By use of an inert blowing agent, this oxygen transmission rate can be reduced by about 10–20%, for example by about 14%, when the container is exposed to pure oxygen as compared to when air is used as the blowing agent.

Another way of measuring shelf-life extension is by measuring the percent of oxygen in the headspace of the container, i.e. the space between the top of a liquid and the container cap. Air blown containers typically begin to show ingress of oxygen into the headspace after 1–3 weeks of storage. In contrast, similarly prepared containers manufactured according to the present invention can resist the ingress of oxygen to the headspace for as long as five weeks. This represents a shelf-life enhancement of 120–300%. A shelf-life enhancement of even 20–100%, or 50–75%, which are achievable according to the present invention, represents a significant and unexpected improvement over the prior art.

The reduction in the oxygen ingress as measured by the OTR or by the amount of headspace oxygen, is maintained until all of the oxygen scavenging compound has reacted and can translate to an extension of the shelf-life of between about four and fourteen days as compared to air blown containers. The shelf life of a product depends on several factors including, for example, the volume of then product, the sensitivity of the product to oxygen, temperature and UV light. For 16 ounce bottles used in the non-limiting examples that follow, and a sensitive product such as orange juice, a typical shelf life is about three months. Thus, the extension of shelf life is on the order of 4–15%. For less air sensitive products that may have a shelf life of up to one year, this represents an extension of shelf life on the order of 1–5%. Similar shelf-life extension can be observed when other plastics or products are used.

Use of the present invention also results in an improvement of the shelf-life for products stored in multilayer containers. Using prior art methods to manufacture a multilayer container where the internal layer, i.e. the layer that will be adjacent to the blowing air, does not contain an oxygen scavenging component does not preclude the loss of some shelf-life. As the bottle is blown with air under high temperature and high pressure conditions, air is forced into the internal layer. As with monolayer systems, the rate of transfer of oxygen into the container walls is higher than under ambient conditions and saturation of the container wall with air is more rapidly and readily achieved. Some air may even be forced into the layer containing the oxygen scavenging component. Moreover, after the container is molded, the air present in the internal layer can continue to diffuse into the layer containing the oxygen scavenging component. Both of these factors reduce the potential shelf-life of the product in the container.

In contrast, in a multilayered container manufactured according to the process of the present invention, the gas forced into the internal layer, and possibly the layer containing the oxygen scavenging component, is an inert blowing agent. If the inert blowing agent enters the layer containing the oxygen scavenging component, it does not consume any of the oxygen scavenging component. Further, in order for oxygen to diffuse into the container walls during storage, it will have to displace the inert blowing agent or the inert blowing agent will have to diffuse out of the walls. Even if oxygen diffuses into the walls, a "buffer layer" of nitrogen will be present and would diffuse into the layer containing the oxygen scavenging component before the oxygen could diffuse into that layer. Both of these effects slow the entry of oxygen into the oxygen scavenging layer and, therefore, less of the oxygen scavenging component will be consumed before filling. Thus, using an inert blowing gas can improve the potential shelf-life of both monolayer and multilayer plastic bottles by delaying the diffusion of oxygen into the oxygen scavenging material.

The invention can also be used to extend to shelf-life of products packaged in multilayer containers having an oxygen barrier layer sandwiched between two oxygen permeable layers. As explained above, during the blow molding process, the blowing agent gas can enter into and saturate the container walls. When air is used as the blowing agent and the container comprises an oxygen barrier layer external to the permeable layer, oxygen can enter into and become "trapped" in the permeable layer during blow molding. After a product is placed in the container, this oxygen can diffuse out of the container wall where it can react with oxygen sensitive contents. By using an inert blowing agent, the permeable walls become saturated with the inert blowing agent, rather than oxygen. Thus the trapped oxygen is eliminated, extending the shelf-life.

EXAMPLE 1

Four 16 ounce PET monolayer bottles containing 2% Amosorb® blended with the base resin were stretch blow molded from preforms stored under identical conditions for identical periods of time to form monolayer bottles. The blown bottles had a mass of 36 grams and were approximately 17 mils thick. Two of the bottles (Air 1 and Air 3) were blown with air and two other bottles (N2-1 and N24) were blown with nitrogen gas. The oxygen transmission rate (OTR) of each of the bottles was measured using an Ox-Tran 2/20 apparatus manufactured by Modern Controls, Inc. (MOCON), which measures the oxygen transmission rate of thin films and packages. Measurements were made using 100% oxygen at 23° C. and 50% relative humidity for more than 500 hours. Results were normalized to 21% oxygen (air) by the instrumentation. FIG. 1 is a graph showing the normalized oxygen transmission rate (OTR), i.e. the oxygen transmission rate in the presence of air (21% oxygen). The OTR data were plotted at twenty hour intervals.

Comparing the N2-1 curve to the Air-1 and Air-3 curves, the OTR for the nitrogen-blown bottle was about 14% lower than that of the air-blown bottles for the first 500 hours of the test period. When normalized, this can translate to an extension of shelf-life of approximately four days over the air-blown bottles. After the first 500 hours, the OTR for all the bottles was similar to that for a 16 oz. monolayer bottle that did not contain an oxygen scavenging compound, i.e., about 0.025–0.032 cc/pkg-day. It is unknown why the data for the N2-2 curve were lower than for the other bottles for the entire test period, including that beyond 500 hours, and these data were not considered in calculating the four day extension of shelf-life. If these data were included, an even longer shelf-life extension would be realized. The downward spikes in all data curves are most likely instrument-related.

EXAMPLE 2

Bottles were prepared under the same conditions as those in Example 1 and filled with 10 mL distilled water. The bottles were sealed with metal plates fitted with septa and purged with high purity nitrogen gas for 20 minutes each. The bottles were stored at room temperature. The amount of oxygen in the headspace of the three nitrogen blown bottles and three air blown bottles was measured immediately and every other week thereafter for a total of 17 weeks.

FIG. 2 is a graph of the percent of oxygen in a nitrogen blown bottle and an air blown bottle. In the air-blown bottles, oxygen began to enter the headspace between the first and third weeks of the test. In contrast, in the nitrogen-blown bottle, oxygen did not enter the headspace until after the fifth week. By week 17, the percentage of oxygen in each bottle was similar. According to these data, the shelf-life of the contents of a nitrogen blown bottle can be extended up to approximately fourteen days beyond the shelf-life of the contents of a standard air blown bottle.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method of extending the shelf-life of a packaged oxygen sensitive product in a plastic container, comprising the steps of:

placing a heated plastic into a mold, said heated plastic comprising an oxygen scavenging component wherein said compressed gas does not react with said oxygen scavenging component;

inflating said heated plastic with a compressed gas that is inert to the oxygen sensitive product;

cooling said inflated container; and removing said cooled container from said mold, wherein said heated plastic comprises a monolayer of plastic comprising an oxygen scavenging component.

2. A method of extending the shelf-life of a packaged oxygen sensitive product in a plastic container, comprising the steps of:

placing a heated plastic into a mold;

inflating said heated plastic with a compressed gas that is inert to the oxygen sensitive product;

cooling said inflated container; and removing said cooled container from said mold, wherein the shelf-life is extended by from about 20% to about 300% as compared to a container inflated with air.

3. A method of extending the shelf-life of a packaged oxygen sensitive product in a plastic container, comprising the steps of:

placing a heated plastic into a mold;

inflating said heated plastic with a compressed gas that is inert to the oxygen sensitive product;

cooling said inflated container; and removing said cooled container from said mold, wherein the shelf-life is extended by from about 50% to about 75% as compared to a container inflated with air.

4. A method of extending the shelf-life of a packaged oxygen sensitive product in a plastic container, comprising the steps of:

placing a heated plastic into a mold;

inflating said heated plastic with a compressed gas that is inert to the oxygen sensitive product;

cooling said inflated container; and removing said cooled container from said mold, wherein the shelf-life is extended by about 5 days as compared to a container inflated with air.

5. A method of extending the shelf-life of a packaged oxygen sensitive product in a plastic container, comprising the steps of:

placing a heated plastic into a mold;

inflating said heated plastic with a compressed gas that is inert to the oxygen sensitive product;

cooling said inflated container; and removing said cooled container from said mold, wherein the shelf-life is extended by about 2 weeks as compared to a container inflated with air.

* * * * *